United States Patent
Kawai

(10) Patent No.: US 9,134,473 B2
(45) Date of Patent: Sep. 15, 2015

(54) SPREAD ILLUMINATING APPARATUS

(71) Applicant: MINEBEA CO., LTD., Kitasaku-gun, Nagano (JP)

(72) Inventor: Shinji Kawai, Iwata (JP)

(73) Assignee: MINEBEA CO., LTD., Nagano (JP)

( * ) Notice: Subject to any disclaimer, the term of this patent is extended or adjusted under 35 U.S.C. 154(b) by 0 days.

(21) Appl. No.: 14/326,938

(22) Filed: Jul. 9, 2014

(65) Prior Publication Data

US 2015/0036385 A1 Feb. 5, 2015

(30) Foreign Application Priority Data

Jul. 31, 2013 (JP) ................................. 2013-159068

(51) Int. Cl.
*F21V 8/00* (2006.01)
*F21V 7/04* (2006.01)

(52) U.S. Cl.
CPC ............ *G02B 6/0011* (2013.01); *G02B 6/0031* (2013.01); *G02B 6/0088* (2013.01); *G02B 6/0091* (2013.01)

(58) Field of Classification Search
CPC .. G02B 6/0011; G02B 6/0031; G02B 6/0091; G02B 6/0088; G02B 6/00; G02B 6/25; G02B 6/255; G02B 6/26; G02B 6/36; G02B 6/42; G02B 7/00; H01R 13/66
USPC ......... 362/600, 606, 608–609, 621, 623–623, 362/627, 631; 349/65
See application file for complete search history.

(56) References Cited

U.S. PATENT DOCUMENTS

| | | | | |
|---|---|---|---|---|
| 6,144,491 A * | 11/2000 | Orikasa et al. | ................ | 359/452 |
| 8,235,572 B2 * | 8/2012 | Hsu et al. | ....................... | 362/607 |
| 2004/0061440 A1 * | 4/2004 | Imai et al. | ..................... | 313/512 |
| 2008/0284315 A1 * | 11/2008 | Tasumi et al. | ................. | 313/503 |
| 2009/0050925 A1 * | 2/2009 | Kuramoto et al. | ............ | 257/100 |
| 2012/0002420 A1 * | 1/2012 | Imai et al. | ................ | 362/249.02 |
| 2012/0302124 A1 * | 11/2012 | Imazu | ............................. | 445/58 |
| 2013/0049058 A1 * | 2/2013 | Kobayakawa | .................. | 257/98 |
| 2013/0328091 A1 * | 12/2013 | Fuke et al. | ...................... | 257/98 |
| 2014/0218889 A1 * | 8/2014 | Kwak | ........................ | 362/23.03 |
| 2015/0076541 A1 * | 3/2015 | Ikeda | ............................. | 257/98 |

FOREIGN PATENT DOCUMENTS

JP    A-2005-259374    9/2005

* cited by examiner

*Primary Examiner* — Anne Hines
*Assistant Examiner* — Jose M Diaz
(74) *Attorney, Agent, or Firm* — Oliff PLC

(57) ABSTRACT

A spread illuminating apparatus includes a plurality of LEDs, an FPC on which the plurality of LEDs are mounted, and a light guide plate. The FPC is fixed to an underside surface of the light guide plate using a double-sided tape, and the plurality of LEDs are disposed opposing an incident light surface of the light guide plate. The double-sided tape includes a white substrate that reflects light and a white adhesive layer that reflects light and is formed on a surface of the white substrate on a side opposing the light guide plate. The white adhesive layer is prepared by mixing a light reflecting substance into an adhesive. Thereby, the brightness and environmental resistance of the spread illuminating apparatus can be improved.

7 Claims, 4 Drawing Sheets

F I G. 1
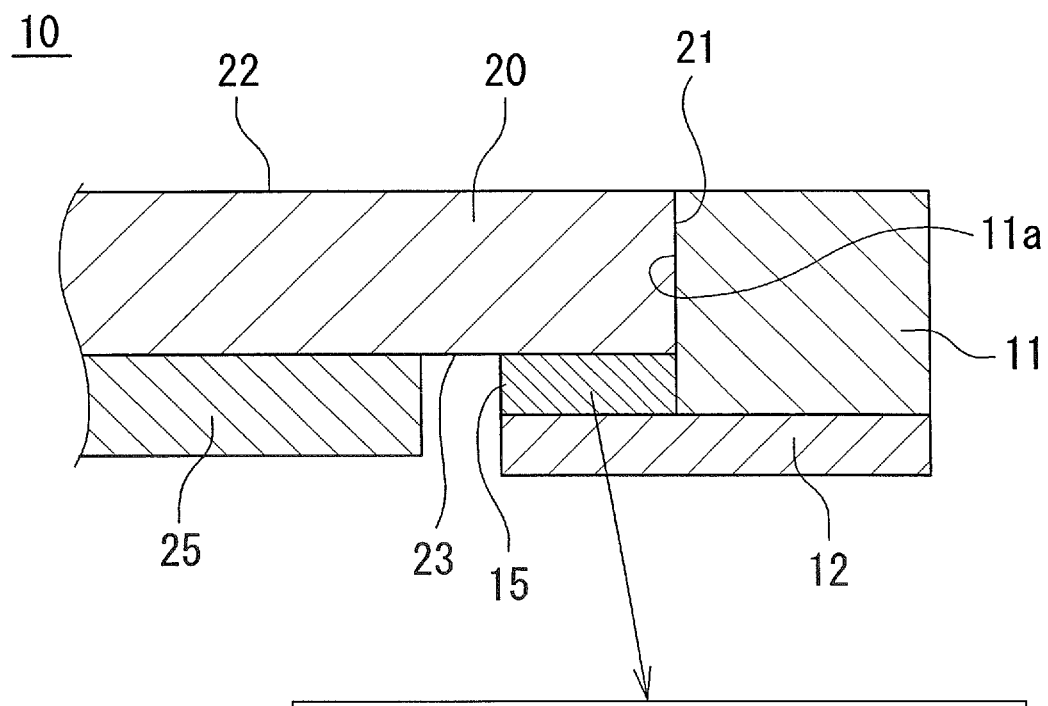
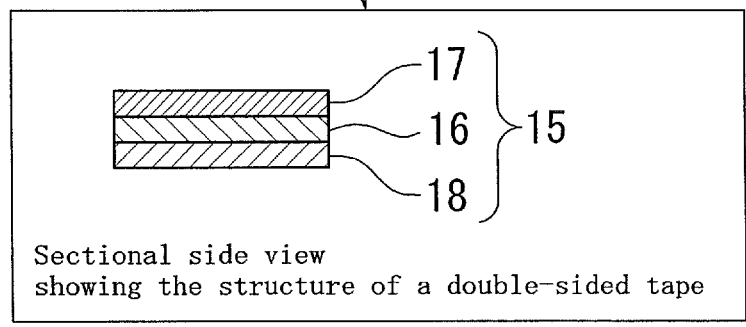
Sectional side view
showing the structure of a double-sided tape F I G. 2
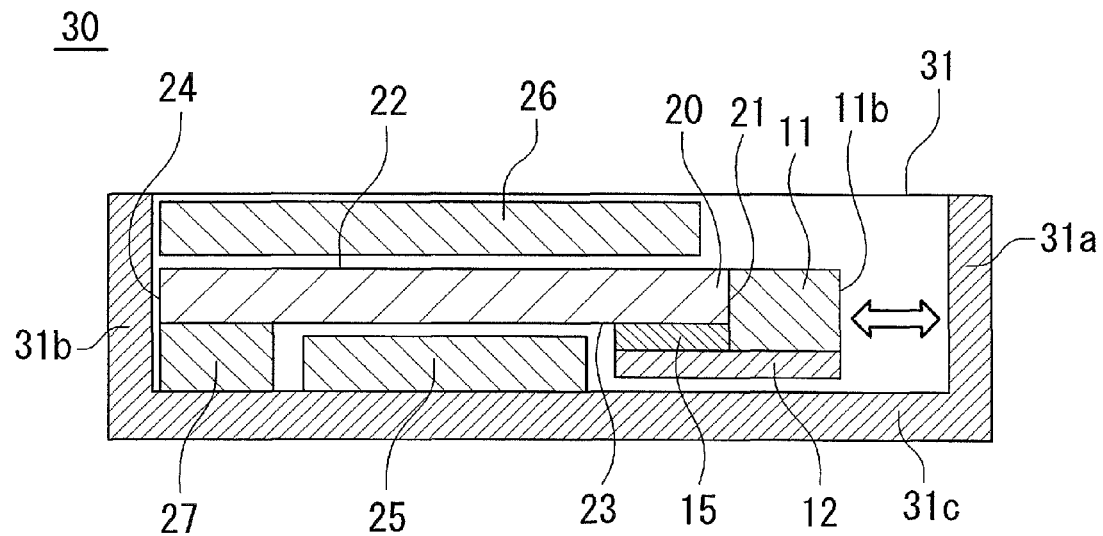
F I G. 3
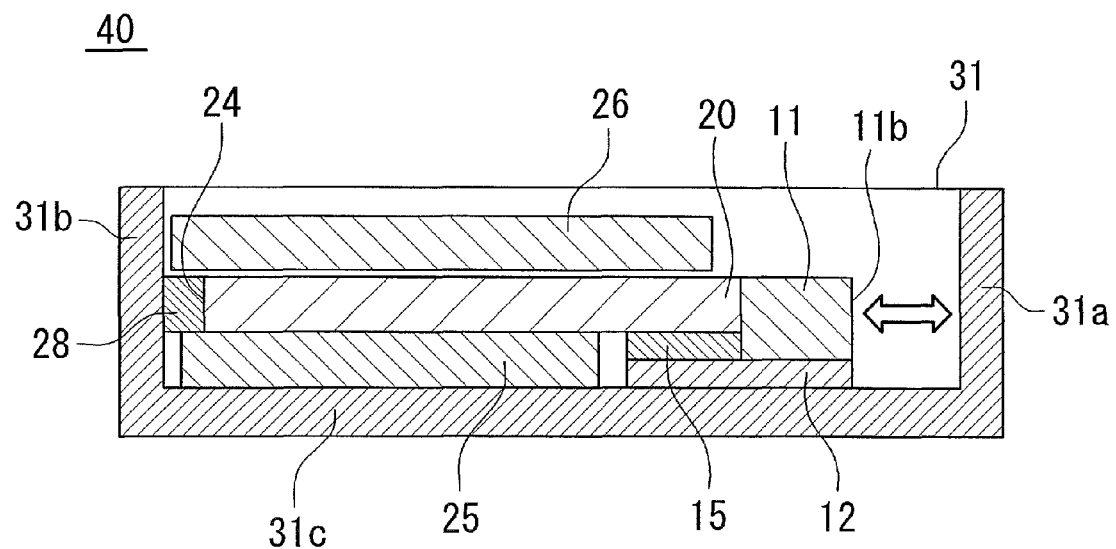

F I G. 4
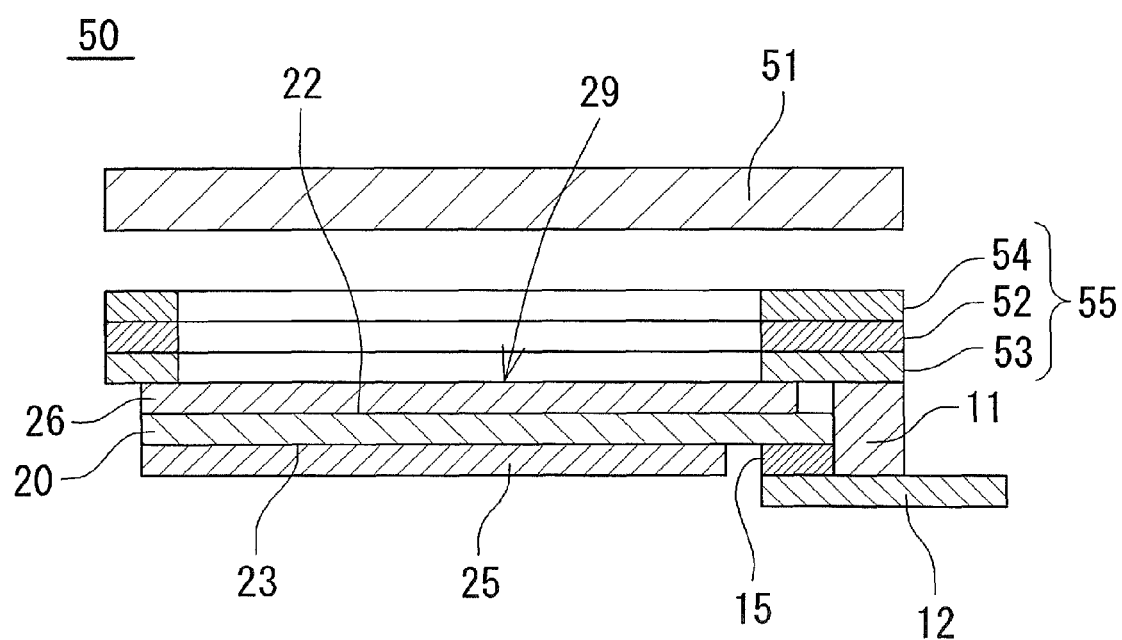

SPREAD ILLUMINATING APPARATUS

BACKGROUND OF THE INVENTION

1. Field of the Invention

The present invention relates to a sidelight-type spread illuminating apparatus including a light guide plate that has a light source disposed at an incident light end surface thereof and emits illumination light in a spread pattern from an emitting surface.

2. Description of the Related Art

As an illumination unit for a liquid crystal display panel, a sidelight-type spread illuminating apparatus (backlight) in which LEDs that are compact and have excellent environmental suitability are disposed along a side end surface of a light guide plate is widely utilized. As shown in a spread illuminating apparatus 100 illustrated in FIG. 5, in a constitution of such a spread illuminating apparatus that is regularly used in order to dispose a plurality of LEDs 102 along a side end surface 101c of a light guide plate 101, a forward portion of a rectangular strip-shaped flexible printed board (hereinafter also referred to as an FPC) 105 on which the plurality of the LEDs 102 are mounted is fixed using a double-sided tape 106 to one principal surface 101b of the light guide plate 101.

However, the double-sided tape 106 is generally formed by applying a transparent adhesive that is acrylic-based, silicone-based, or the like to both surfaces of a transparent substrate such as a PET film. Thus, in such an arrangement, there has been a problem in that optical loss may occur when light emitted from the LEDs 102 progresses into portions of the double-sided tape 106 disposed in front of the LEDs 102, leading to brightness reduction of the spread illuminating apparatus 100.

The applicant of the present application previously proposed a spread illuminating apparatus that overcomes the above-described problem by configuring the LEDs as point light sources and disposing a plurality of these LEDs such that they are separated from each other along a side end surface of the light guide plate (for example, refer to Japanese Patent Application Laid-Open (JP-A) No. 2005-259374). As shown in FIG. 6, in this spread illuminating apparatus 110, double-sided tapes 116, 117, 118, and 119 that adhere an FPC 115 to one principal surface 111b of a light guide plate 111 are arranged intermittently in regions excluding the portions in front of LEDs 112, 113, and 114. Thereby, in the spread illuminating apparatus 110, the amount of light that progresses into the double-sided tapes 116, 117, 118, and 119 after being emitted from the LEDs 112, 113, and 114 is reduced compared to the spread illuminating apparatus 100 shown in FIG. 5, and thus reductions in brightness of the spread illuminating apparatus 110 can be suppressed.

SUMMARY OF THE INVENTION

However, in the structure in which the double-sided tapes 116, 117, 118, and 119 are disposed intermittently as in the spread illuminating apparatus 110, there is less surface area for adhesion compared to the structure in which the double-sided tape 106 is disposed continuously as in the spread illuminating apparatus 100, and thus the adhesion strength is lower. Therefore, in the case that stress occurs between the light guide plate 111 and the FPC 115 due to deformation (expansion/contraction) that occurs mainly in the light guide plate 111 along with changes in the environment such as temperature and humidity, the structure in which the double-sided tapes 116, 117, 118, and 119 are disposed intermittently is disadvantageous with regard to securing a surface area for adhesion (and in turn, adhesion strength) that can handle such stress and stably maintaining the positional relationship between the light guide plate 111 and the LEDs 112, 113, and 114 over a long period of time. In particular, in accordance with recent increases in the information to be displayed on electronic devices, the display region of such devices has been expanding. If the size of the light guide plate and the size of the FPC on which the LEDs are mounted are increased in a spread illuminating apparatus in order to accommodate such expansions, the stress on each member due to the above-described environmental changes also increases, and this may lead to problems in that it is difficult to secure a sufficient surface area for adhesion with the double-sided tapes 116, 117, 118, and 119.

Also, there have recently been demands for further increases in the brightness of spread illuminating apparatuses in order to compensate for decreases in transmittance that accompany increases in the definition of liquid crystal display panels.

The present invention was created in consideration of the above-described problems, and an object thereof is to provide a spread illuminating apparatus that achieves excellent brightness and environmental resistance.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures in which a portion of the components in the aspects below is substituted or deleted, or another component is added upon referring to the best modes for carrying out the invention.

According to a first aspect of the invention, a spread illuminating apparatus includes: a plurality of light sources, a circuit board on which the plurality of light sources are mounted, and a light guide plate including an end surface at which the plurality of light sources are disposed in an opposing manner and a principal surface to which the circuit board is fixed using a double-sided tape, wherein the double-sided tape comprises a white substrate that reflects light and a white adhesive layer that reflects light and is formed on a surface of the white substrate on a side opposing the light guide plate, and the white adhesive layer is prepared by mixing a light reflecting substance into an adhesive.

With this structure, the double-sided tape used for fixing the circuit board to a principal surface of the light guide plate includes a white substrate that reflects light and a white adhesive layer that reflects light and is formed on the surface of the white substrate on a side opposing the light guide plate. Therefore, even if the light emitted from the light sources progresses into the double-sided tape, the light is reflected by the white adhesive layer and the white substrate and thus is returned to the light guide plate. Thereby, optical loss can be reduced and the brightness of the spread illuminating apparatus can be improved.

In this structure, even if the light emitted from the light sources progresses into the double-sided tape, the light is reflected by the white adhesive layer and the white substrate and thus is returned to the light guide plate as described above. Thus, it is not necessary to dispose the double-sided tape intermittently in regions excluding the portions in front of the light sources in order to prevent optical loss due to light emitted from the light sources progressing into the double-sided tape. For example, the double-sided tape can be disposed to extend continuously over a desired length without interruption at portions in front of the plurality of light sources along the longitudinal direction of the end surface of the light guide plate at which the light sources are disposed in an opposing manner. Thereby, when fixing the circuit board onto the light guide plate, a wide surface area for adhesion, and in turn a high adhesion strength, can be secured.

Thereby, even if stress occurs between the light guide plate and the circuit board due to deformations of the light guide plate that occur along with changes in the environment such as temperature and humidity, a surface area for adhesion (and in turn, adhesion strength) that can handle such stress can be secured and the positional relationship between the light guide plate and the light sources can be stably maintained over a long period of time.

Based on this structure, improvements in the environmental resistance can be realized without any decreases in the brightness.

Further, according to the first aspect of the present invention, in the double-sided tape, the thickness of the white adhesive layer is greater than that of the white substrate.

With this structure, the brightness of the spread illuminating apparatus and the adhesion strength of the double-sided tape can be further improved.

Still further, according to the first aspect of the present invention, the spread illuminating apparatus further includes a frame that accommodates the plurality of light sources and the light guide plate, wherein an end surface or a vicinity thereof of the light guide plate that opposes the end surface on the side at which the light sources are disposed is fixed to the frame using the double-sided tape.

With this structure, the light guide plate is fixed in a cantilevered fashion to a frame at or near an end surface that opposes the end surface on the side at which the light sources are disposed. Thereby, even if the light guide plate expands/contracts due to changes in the environment such as temperature and humidity, the positional relationship between the light sources and the end surface of the light guide plate on the side at which the light sources are disposed can be stably maintained.

In this structure, the brightness of the spread illuminating apparatus can be further improved by a light reflecting effect of the double-sided tape disposed on or near an end surface of the light guide plate that opposes the end surface on the side at which the light sources are disposed.

Yet, further, according to the first aspect of the present invention, the light reflecting substance is a white pigment.

With this structure, brightness unevenness near the light sources can be reduced by a light diffusing effect of the white pigment mixed into the adhesive.

Based on the structures described above, a spread illuminating apparatus that achieves excellent brightness and environmental resistance can be provided.

BRIEF DESCRIPTION OF DRAWINGS

FIG. 1 is a side cross-section view illustrating the essential parts of a spread illuminating apparatus according to a first embodiment of the present invention, and is a side cross-section view illustrating a double-sided tape used in the spread illuminating apparatus;

FIG. 2 is a side cross-section view illustrating the essential parts of a spread illuminating apparatus according to a second embodiment of the present invention;

FIG. 3 is a side cross-section view illustrating the essential parts of another example of the spread illuminating apparatus according to the second embodiment of the present invention;

FIG. 4 is a side cross-section view illustrating the essential parts of an alternative embodiment of the spread illuminating apparatus according to the present invention;

DETAILED DESCRIPTION

Figure 5:
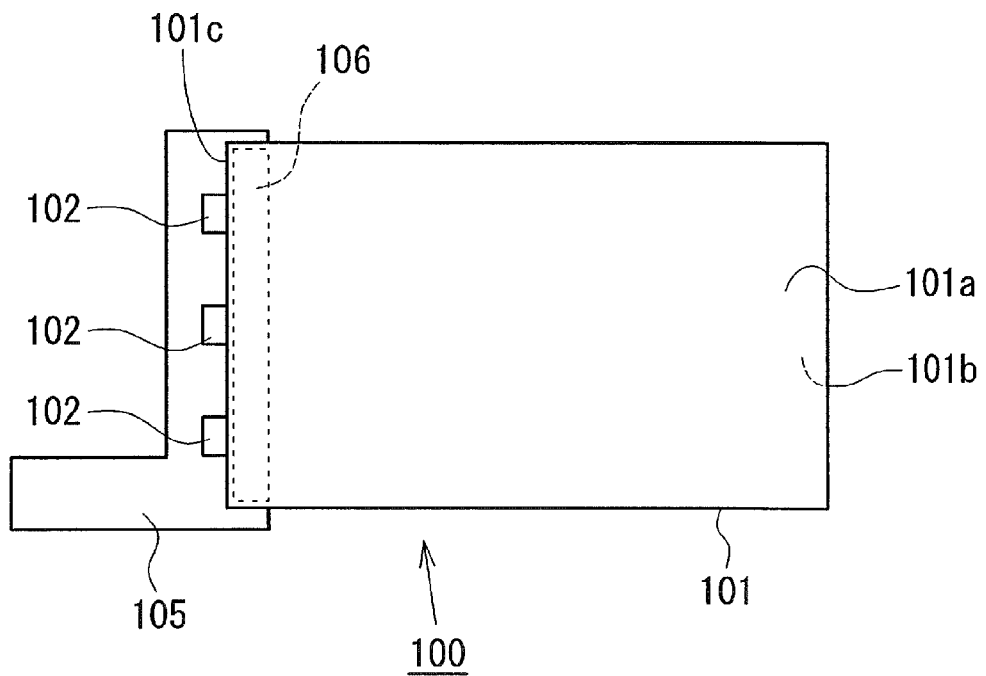
FIG. 5 is a plan view illustrating an example of a conventional spread illuminating apparatus.

A spread illuminating apparatus according to an embodiment of the present invention will be explained below referring to the drawings. In the attached drawings, the shape, dimensions, etc. of each constituent element are appropriately exaggerated in order to facilitate the understanding of the present invention. Similarly, spaces are appropriately inserted between adjacent constituent elements in order to facilitate the understanding of the present invention. Unless explicitly stated to the contrary, the structure of the present invention should not be construed as limited by the presence/absence of such spaces. In addition, even if a space does exist between adjacent constituent elements in the actual structure, the dimensions of such a space are appropriately exaggerated in the attached drawings in order to facilitate the understanding of the present invention.

As shown in FIG. 1, a spread illuminating apparatus 10 according to a first embodiment of the present invention includes LEDs 11 as light sources, a flexible circuit board (FPC) 12 as a circuit board on which the LEDs 11 are mounted, and a light guide plate 20. The light guide plate 20 is formed in a rectangular shape when viewed from the top surface using a transparent material (for example, a polycarbonate resin). On its outer surface, the light guide plate 20 includes an incident light surface 21, which is an end surface into which light emitted from the LEDs 11 enters. Light that enters from the incident light surface 21 is emitted in a spread pattern from one of two principal surfaces 22 and 23 that oppose each other (in the illustrated example, the principal surface 22). Hereinafter, the principal surface 22 will also be referred to as an emitting surface 22, and the principal surface 23 will also be referred to as an underside surface 23. In the spread illuminating apparatus 10, a reflecting sheet 25 for reflecting light that has leaked from the underside surface 23 and returning it back into the light guide plate 20 is disposed on the underside surface 23 side of the light guide plate 20.

Herein, in the present invention, the direction from the incident light surface 21 toward the end surface (omitted from FIG. 1) opposing the incident light surface 21 (leftward direction on the paper surface in FIG. 1) will be referred to as "forward" (and the opposite direction thereto will be referred to as "rearward"). Further, the direction in which the underside surface 23 faces the emitting surface 22 (upward direction on the paper surface in FIG. 1) will be referred to as "upward" (and the opposite direction thereto will be referred to as "downward"). Upward-downward direction according to these definitions may also be referred to as "thickness direction". In addition, the direction that is orthogonal to forward-rearward direction and the upward-downward direction (the direction orthogonal to the paper surface in FIG. 1) may also be referred to as "left-right direction" (when necessary, defined as "leftward" and "rightward" toward forward direction). In other words, the left-right direction is longitudinal direction of the incident light surface 21.

The spread illuminating apparatus 10 includes a plurality of the LEDs 11, and these LEDs 11 are mounted with their light emitting surfaces 11a facing forward on a rearward portion of the FPC 12 formed in a rectangular strip shape when viewed from the top surface along the longitudinal direction of the FPC 12 (the direction orthogonal to the paper surface in FIG. 1).

A forward portion of the FPC 12 is fixed using a double-sided tape 15 to a portion of the underside surface 23 of the light guide plate 20 near the incident light surface 21. Thereby, the plurality of the LEDs 11 are fixed and disposed opposing the incident light surface 21 in a state in which they are arranged along the longitudinal direction of the incident light surface 21 of the light guide plate 20.

Herein, as shown in FIG. 1, the double-sided tape 15 includes a substrate 16, and adhesive layers 17 and 18 formed on both surfaces of the substrate 16. In the spread illuminating apparatus 10, the substrate 16 of the double-sided tape 15 is a white substrate that reflects light, and is made of, for example, a white PET film formed by kneading a white pigment such as titanium oxide into a polyethylene terephthalate (PET) resin. Further, among the two adhesive layers 17 and 18, at least the adhesive layer formed on the surface of the substrate 16 on the side opposing the light guide plate 20 (for the sake of explanation, this adhesive layer will be referred to as adhesive layer 17) is a white adhesive layer that reflects light, specifically prepared by mixing the white pigment such as titanium oxide as a light reflecting substance into a transparent adhesive (for example, an acrylic-based adhesive). When using titanium oxide as the white pigment, the particle size thereof is, for example, 10 µm.

Further, in the double-sided tape 15, the adhesive layer 17 that is constituted as the white adhesive layer is preferably formed to have a thickness that is greater than the thickness of the substrate 16 which is the white substrate.

The present invention is not limited by the specific means for imparting the substrate 16 with a light reflecting property, and, for example, the substrate 16 can also be made white by another means such as foaming. Also, even if the substrate 16 is formed by kneading the light reflecting substance into a resin material that is the base material, the light reflecting substance is not limited to the white pigment. For example, in order to impart the substrate 16 with a light reflecting property, a metal with excellent light reflectivity such as silver or aluminum can be deposited onto a transparent substrate. In the present invention, including the above-described embodiments, the substrate 16 that has the light reflecting property will be referred to for convenience as a white substrate. Similarly, with regard to the adhesive layer 17, in the present invention, the adhesive layer 17 that has the light reflecting property will be referred to for convenience as a white adhesive layer regardless of what kind of substance is mixed therein.

When the FPC 12 is fixed to the light guide plate 20, the double-sided tape 15 is interposed between the underside surface 23 of the light guide plate 20 and the FPC 12 in a state in which the white adhesive layer 17 is adhered to the underside surface 23 of the light guide plate 20 and the other adhesive layer 18 is adhered to the FPC 12. Further, the double-sided tape 15 is formed in the rectangular strip shape when viewed from the top surface and the longitudinal direction thereof matches the longitudinal direction of the FPC 12. The double-sided tape 15 is disposed at the forward portion of the FPC 12 to extend continuously along the longitudinal direction of the FPC 12 without interruption at portions in front of the LEDs 11. Typically, when the double-sided tape 15 is fixed to the light guide plate 20, it extends continuously across approximately the entire length thereof along the longitudinal direction of the incident light surface 21 as in the double-sided tape 106 of the conventional spread illuminating apparatus 100 shown in FIG. 5. The width (the length in shorter-dimension direction) of the double-sided tape 15 is, for example, 1 mm.

In the spread illuminating apparatus 10 configured as described above, even if light emitted from the LEDs 11 progresses into the double-sided tape 15, it is reflected by the white adhesive layer 17 adhered to the underside surface 23 of the light guide plate 20 and by the white substrate 16 under the white adhesive layer 17 and thus returned to the light guide plate 20. Therefore, compared to the conventional spread illuminating apparatus 100 shown in FIG. 5, the loss of light can be reduced and the brightness of the spread illuminating apparatus can be improved.

Figure 6:
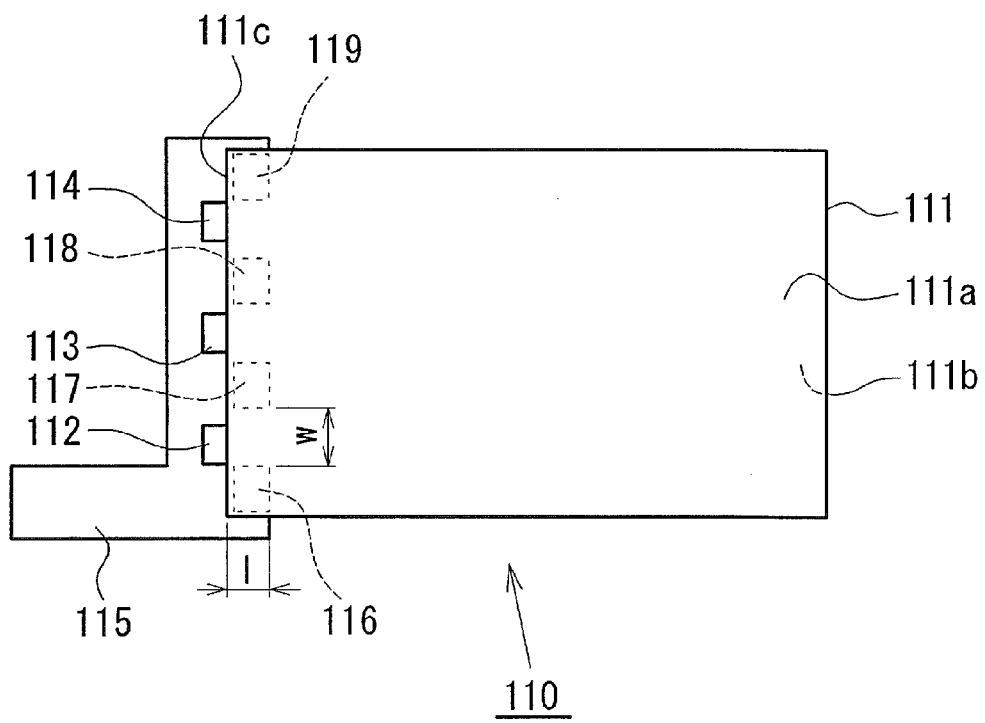
FIG. 6 is a plan view illustrating another example of a conventional spread illuminating apparatus.

Further, in the spread illuminating apparatus 10, improvement in the brightness as described above is realized in a state in which the double-sided tape 15 is disposed to extend continuously across a desired length (for example, approximately the entire length of the longitudinal direction of the incident light surface 21) without interruption at portions in front of the LEDs 11 along the longitudinal direction of the incident light surface 21 of the light guide plate 20. Therefore, compared to the conventional spread illuminating apparatus 110 shown in FIG. 6, a wide surface area for adhesion for fixing the FPC 12 to the light guide plate 20, and in turn a high adhesion strength, can be secured and the environmental resistance of the spread illuminating apparatus 10 can be improved without any reductions in the brightness. In particular, in the spread illuminating apparatus 10, even if stress occurs between the light guide plate 20 and the FPC 12 due to deformations that occur mainly in the light guide plate 20 along with changes in the environment such as temperature and humidity, a surface area for adhesion (and in turn, adhesion strength) that can handle such stress can be secured and the positional relationship between the light guide plate 20 and the LEDs 11 can be stably maintained over a long period of time.

Moreover, as will be explained later with reference to examples, the present inventors discovered through investigation and research that the brightness and adhesion strength is improved by setting the thickness of the white adhesive layer 17 of the double-sided tape 15 to be greater than the thickness of the white substrate 16, compared to a case in which the total thickness is the same but the thickness of the white adhesive layer 17 is set to be less than the thickness of the white substrate 16.

This structure of the double-sided tape 15 is particularly advantageous when the spread illuminating apparatus 10 is used as a backlight for relatively large and high definition liquid crystal display panels installed in tablet terminals, notebook PCs, and the like.

Also, in the spread illuminating apparatus 10, brightness unevenness near the LEDs 11 can be reduced and brightness uniformity can be improved by the light diffusing effect of the white pigment mixed into the white adhesive layer 17 of the double-sided tape 15.

Herein, in the double-sided tape 15, for the adhesive layer 18 on the side that is adhered to the FPC 12, an adhesive layer having any appropriate characteristics with respect to the optical characteristics related to transmission, absorption, and reflection of light and the mechanical characteristics such as adhesion strength can be used. For example, the adhesive layer 18 can be a transparent adhesive layer (for example, an adhesive layer made of the acrylic-based adhesive) similar to the adhesive layers of a conventional double-sided tape. Alternatively, the adhesive layer 18 can also be the white adhesive layer similar to the adhesive layer 17 on the side that is adhered to the underside surface 23 of the light guide plate 20.

Next, a second embodiment of the present invention will be explained referring to FIGS. 2 and 3. In the following, constituent elements that are identical to or correspond to those of the spread illuminating apparatus 10 in the first embodiment explained above will be assigned the same reference numerals and explanations of redundant portions will be omitted. Thus, the following explanations will focus mainly on the points of difference from the spread illuminating apparatus 10.

A spread illuminating apparatus 30 shown in FIG. 2 includes a lidless box-shaped frame 31. The light guide plate 20 is accommodated in this frame 31 together with the FPC 12 fixed to the light guide plate 20 and the plurality of LEDs 11 mounted onto the FPC 12. The reflecting sheet 25 and a brightness enhancing sheet 26 are also accommodated in the frame 31 in a state in which they are respectively disposed on the underside surface 23 side and the emitting surface 22 side of the light guide plate 20.

In the spread illuminating apparatus 30, a portion of the underside surface 23 of the light guide plate 20 near an end surface 24 (hereinafter also referred to as a "terminal surface") that opposes the incident light surface 21 is fixed to a bottom part 31c of the frame 31 using a double-sided tape 27. In contrast, the incident light surface 21 side of the light guide plate 20 is not fixed to the frame 31 (in FIG. 2, the light guide plate 20 is fixed in a cantilevered manner to the frame 31 with the terminal surface 24 side as a fixed end and the incident light surface 21 side as a free end), and a predetermined space (indicated by a double arrow in FIG. 2) is provided between a back surface 11b of the LEDs 11 and a side wall 31a of the frame 31 that opposes the back surface 11b of the LEDs 11.

Similar to the double-sided tape 15 that fixes the FPC 12 to the light guide plate 20, the double-sided tape 27 includes a white substrate 16 and a white adhesive layer 17 formed on the surface of the substrate 16 on the side that opposes the light guide plate 20 (refer to FIG. 1B). In a state in which the light guide plate 20 is fixed to the frame 31, the double-sided tape 27 is interposed between the underside surface 23 of the light guide plate 20 and the bottom part 31c of the frame 31 in a state in which the white adhesive layer 17 is adhered to the underside surface 23 of the light guide plate 20 and the other adhesive layer 18 is adhered to the bottom part 31c of the frame 31. Further, the double-sided tape 27 is formed in a rectangular strip shape when viewed from the top surface, and the longitudinal direction thereof is disposed to match the longitudinal direction of the terminal surface 24, and thus the double-sided tape 27 extends continuously across, for example, approximately the entire length of the longitudinal direction of the terminal surface 24. The width (the length in the shorter-dimension direction) of the double-sided tape 27 is, for example, 1 mm.

In the spread illuminating apparatus 30, the FPC 12 is fixed to the light guide plate 20 by the same structure as in the spread illuminating apparatus 10 using the double-sided tape 15. Thereby, the same operational effects as those described above with regard to the spread illuminating apparatus 10 are achieved. In addition, in the spread illuminating apparatus 30, a portion of the underside surface 23 of the light guide plate 20 near the terminal surface 24 is fixed to the bottom part 31c of the frame 31 using the double-sided tape 27, and thus the following operational effects are also achieved.

In the spread illuminating apparatus 30, given the above-described structure, if the light guide plate 20 expands/contracts due to changes in the environment such as temperature and humidity, the expansion/contraction is realized as displacement of the light guide plate 20 on the incident light surface 21 side that is not fixed to the frame 31. This displacement is absorbed by the space provided between the back surface 11b of the LEDs 11 and the side wall 31b, and thus the integrated state of the light guide plate 20 and the FPC 12, and in turn the plurality of LEDs 11 mounted on the FPC 12, is maintained.

In this way, in the spread illuminating apparatus 30, even if the light guide plate 20 expands/contracts due to changes in the environment such as temperature and humidity, the positional relationship between the incident light surface 21 of the light guide plate 20 and the LEDs 11 can be stably maintained.

Also, in the spread illuminating apparatus 30, the double-sided tape 27 that fixes the light guide plate 20 to the frame 31 includes the white substrate 16 and the white adhesive layer 17 formed on the surface of the white substrate 16 that opposes the light guide plate 20 as in the double-sided tape 15. Thus, the brightness of the spread illuminating apparatus 30 can be further improved by the light reflecting effect of the double-sided tape 27.

As another example of the second embodiment of the present invention, FIG. 3 illustrates a spread illuminating apparatus 40. The spread illuminating apparatus 40 differs from the spread illuminating apparatus 30 shown in FIG. 2 in that when fixing the light guide plate 20 to the frame 31, the terminal surface 24 of the light guide plate 20 is fixed to a side wall 31b of the frame 31 that opposes the terminal surface 24. However, in the spread illuminating apparatus 40, this fixation is also accomplished with a double-sided tape 28, and the double-sided tape 28 includes a white substrate 16 and a white adhesive layer 17 formed on the surface of the white substrate 16 on the side that opposes the light guide plate 20 as in the double-sided tape 15 that fixes the FPC 12 to the light guide plate 20 (refer to FIG. 1).

In the spread illuminating apparatus 40, in a state in which the light guide plate 20 is fixed to the frame 31, the double-sided tape 28 is interposed between the terminal surface 24 of the light guide plate 20 and the side wall 31b of the frame 31 in a state in which the white adhesive layer 17 is adhered to the terminal surface 24 of the light guide plate 20 and the other adhesive layer 18 is adhered to the side wall 31b of the frame 31. Further, the double-sided tape 28 is formed in a rectangular strip shape when viewed from the top surface, and the longitudinal direction thereof is disposed to match the longitudinal direction of the terminal surface 24, and thus the double-sided tape 28 extends continuously across, for example, approximately the entire length of the longitudinal direction of the terminal surface 24. The width (the length in the shorter-dimension direction) of the double-sided tape 28 is, for example, approximately the same as the thickness of the terminal surface 24.

The spread illuminating apparatus 40 configured as described above achieves the same operational effects as the spread illuminating apparatus 30 shown in FIG. 2. In addition, comparing the structures of the spread illuminating apparatus 30 and the spread illuminating apparatus 40, the structure of the spread illuminating apparatus 30 which provides a large degree of freedom to select the width (and thus the surface area for adhesion) of the double-sided tape 27 is advantageous with respect to securing adhesive strength between the light guide plate 20 and the frame 31. Meanwhile, according to the structure of the spread illuminating apparatus 40, the terminal surface 24 of the light guide plate 20 is also fixed to the frame 31. Thus, the terminal surface 24 side of the underside surface 23 of the light guide plate 20 can be completely covered by the reflecting sheet 25. Further, light that has leaked from the terminal surface 24 of the light guide plate 20 can also be reflected by the double-sided tape 28 and returned into the light guide plate 20, and thereby the brightness of the spread illuminating apparatus 40 can be further improved. Also, the structure of the spread illuminating apparatus 40 in which the double-sided tape 28 is disposed on the terminal surface 24 rather than the underside surface 23 of the light guide plate 20 is advantageous with respect to making the apparatus thin.

EXAMPLES

Next, examples of the spread illuminating apparatus according to the present invention will be explained below. In the following, a double-sided tape that includes the white substrate 16 and the white adhesive layer 17 as in the double-sided tapes 15, 27, and 28 will also be referred to as a white double-sided tape, whereas a conventional double-sided tape in which transparent adhesive layers are formed on both surfaces of a transparent substrate as in the double-sided tapes 106, 116, 117, and 118 shown in FIGS. 5 and 6 will also be referred to as a transparent double-sided tape.
(Structure and Reflectance of White Double-Sided Tape)

First, two types of white-double sided tapes (Sample 1 and Sample 2) in which the thickness ratio between the white substrate and the white adhesive layer is different were prepared as white double-sided tapes according to the present invention. The reflectance of light having a wavelength of 550 nm was measured and the results obtained thereby are shown in the following table.

Sample 1 and Sample 2 used in this measurement include the white adhesive layer on both surfaces of the white substrate, and the thicknesses of the two white adhesive layers are the same.

TABLE 1

|  | Sample 1 | Sample 2 |
|---|---|---|
| Overall Thickness (μm) | 80 | 80 |
| Thickness of White Substrate (μm) | 38 | 20 |
| Thickness of White Adhesive Layers (μm) | 21 | 30 |
| Reflectance (%, Wavelength 550 nm) | 91 | 92 |

From the above results, both Sample 1 and Sample 2 were confirmed to have good reflectance. Also, comparing the reflectance of Sample 1 (91%) with the reflectance of Sample 2 (92%), whose overall thicknesses are the same (80 μm), it was found that Sample 2 in which the thickness of the white adhesive layers (30 μm) is greater than the thickness of the white substrate (20 μm) exhibited a higher reflectance than Sample 1 in which the thickness of the white adhesive layers (21 μm) is less than the thickness of the white substrate (38 μm).
(Brightness Characteristics of an Actual Device)

Next, spread illuminating apparatuses according to the present invention were prepared as samples and the brightness thereof was measured. The results are shown in the following table together with a comparative example. The spread illuminating apparatuses that were prepared for both the comparative examples and the examples include a frame (corresponding to the frame 31 shown in FIGS. 2 and 3), and include a structure in which the FPC on which the LEDs are mounted is fixed to a portion of the underside surface of the light guide plate near the incident light surface using a double-sided tape and a portion of the underside surface of the light guide plate near the terminal surface is fixed to the frame using a double-sided tape.

Actual Device No. 1 is a comparative example in which a conventional transparent double-sided tape was used to fix the FPC to the light guide plate, and a black double-sided tape (a double-sided tape in which transparent adhesive layers are formed on both surfaces of a black substrate), which is conventionally and generally used to fix a light guide plate to a frame, was used to fix the light guide plate to the frame. Actual Device Nos. 2 to 4 are examples of the spread illuminating apparatus according to the present invention using a white double-sided tape (Sample 1 or Sample 2 above) to fix the FPC to the light guide plate. However, in Actual Device Nos. 2 and 3, a black double-sided tape identical to that used in the comparative example was used to fix the light guide plate to the frame, whereas in Actual Device No. 4, a white double-sided tape (Sample 2 above) was used to fix the light guide plate to the frame (corresponding to the spread illuminating apparatus 30 shown in FIG. 2).

The brightness measurements below are indicated as a relative brightness based on the brightness of the spread illuminating apparatus of the comparative example, Actual Device No. 1, which is regarded as 100.

TABLE 2

| Actual Device No. | Fixation of FPC | Fixation of Light Guide Plate | Relative Brightness |
|---|---|---|---|
| 1 | Transparent Double-Sided Tape | Black Double-Sided Tape | 100 |
| 2 | Sample 1 | Black Double-Sided Tape | 105 |
| 3 | Sample 2 | Black Double-Sided Tape | 106 |
| 4 | Sample 2 | Sample 2 | 109 |

From the above results, it can be seen that the spread illuminating apparatuses of the examples of the present invention, Actual Device Nos. 2 to 4, all exhibit remarkably improved brightness compared to the spread illuminating apparatus of the comparative example, Actual Device No. 1. In particular, comparing Actual Device. No. 1 with Actual Device Nos. 2 and 3, it can be seen that the effect of improving the brightness is achieved by using the white double-sided tape (Sample 1 and Sample 2) instead of the conventional transparent double-sided tape to fix the FPC to the light guide plate.

Among the examples of the present invention, comparing Actual Device No. 2 with Actual Device No. 3, it can be understood that the brightness can be further improved by using the white double-sided tape of Sample 2 instead of the white double-sided tape of Sample 1 as the white double-sided tape used to fix the FPC to the light guide plate. As described above in (Structure and Reflectance of White Double-Sided Tape), this is believed to be an effect in which the higher reflectance of Sample 2 than that of Sample 1 is reflected in the brightness of the spread illuminating apparatus. Therefore, a structure in which the white double-sided tape according to the present invention is configured such that the thickness of the white adhesive layers is greater than the thickness of the white substrate as in Sample 2 is preferable in terms of improving the brightness.

Further, among the examples of the present invention, comparing Actual Device No. 3 with Actual Device No. 4, it can be understood that the brightness can be further improved by using the white double-sided tape (Sample 2) instead of the black double-sided tape as the double-sided tape used to fix the light guide plate to the frame. Therefore, if the spread illuminating apparatus according to the present invention has a frame that accommodates the light guide plate and the light sources, and the light guide plate is fixed to the frame using a double-sided tape, the brightness of the spread illuminating apparatus can be further improved by using the white double-sided tape according to the present invention as this double-sided tape.

Furthermore, in these brightness measurements, it was confirmed that brightness unevenness near the LEDs was reduced in the spread illuminating apparatuses of Actual Device Nos. 2 to 4 compared to the spread illuminating apparatus of Actual Device No. 1 by a light diffusing effect of the white pigment that is mixed into the white double-sided tape.

(Adhesion Strength)

Next, the results of measuring the adhesion strength of the white double-sided tape according to the present invention are shown in the following table. The samples of the white double-sided tape used in these measurements include Sample 1 and Sample 2 described above, as well as Sample 3 in which the thickness of the white adhesive layers (35 μm) is greater than the thickness of the white substrate (13 μm) similar to Sample 2. However, in Sample 3, the overall thickness and the ratio of the thickness of the white adhesive layers to the thickness of the white substrate is greater than those in Sample 2.

As in Sample 1 and Sample 2, Sample 3 has white adhesive layers on both surfaces of the white substrate and the thicknesses of the two white adhesive layers are the same.

In these measurements of the adhesion strength, a polycarbonate was used as the object to which each sample is adhered, and a force (N/20 mm) when peeling off each sample having a width of 20 mm from the object to which each sample is adhered was measured under conditions in which a peeling angle is 180° and a peeling speed is 300 mm/minute.

TABLE 3

|  | Sample 1 | Sample 2 | Sample 3 |
| --- | --- | --- | --- |
| Overall Thickness (μm) | 80 | 80 | 83 |
| Thickness of White Substrate (μm) | 38 | 20 | 13 |
| Thickness of White Adhesive Layers (μm) | 21 | 30 | 35 |
| Adhesion Strength (N/20 mm) | 13.5 | 14.0 | 14.5 |

In the above results, comparing the adhesion strength of Samples 1 to 3, it can be understood that Samples 2 and 3 in which the thickness of the white adhesive layers is greater than the thickness of the white substrate exhibit a higher adhesion strength than that of Sample 1 in which the thickness of the white adhesive layers is less than the thickness of the white substrate. Also, it can be seen that the adhesion strength shows a tendency to increase as the ratio of the thickness of the white adhesive layers to the thickness of the white substrate increases. Therefore, a structure in which the white double-sided tape according to the present invention is configured such that the thickness of the white adhesive layers is greater than the thickness of the white substrate as in Samples 2 and 3 is preferable in terms of improving the adhesion strength of the white double-sided tape, and in turn improving the environmental resistance.

Furthermore, three reliability tests including a high temperature test (65° C., 240 hours), a high temperature/high humidity test (60° C., 90%, 240 hours), and a cold/hot impact test (30° C. to 70° C., 30 minutes, 100 cycles) were conducted using the Actual Device No. 4 mentioned above in which the white double-sided tape of Sample 2 is used for both fixing the FPC to the light guide plate and fixing the light guide plate to the frame. In the results thereof, it was confirmed that the spread illuminating apparatus has characteristics with respect to both brightness and environmental resistance that satisfy the specifications normally required for a backlight of an electronic device having a relatively large display region such as a tablet terminal.

The present invention was explained above referring to preferred embodiments thereof. However, the spread illuminating apparatus according to the present invention is not limited to the above embodiments. For example, in the spread illuminating apparatuses 10, 30, and 40, the FPC 12 is fixed to the underside surface 23 of the light guide plate 20. However, the FPC 12 can also be fixed at a forward portion thereof to a portion of the emitting surface 22 of the light guide plate 20 near the incident light surface 21 using the double-sided tape 15. Therein, the double-sided tape 15 is interposed between the emitting surface 22 of the light guide plate 20 and the FPC 12 in a state in which the white adhesive layer 17 is adhered to the emitting surface 22 of the light guide plate 20 and the other adhesive layer 18 is adhered to the FPC 12.

As shown in FIG. 4, in a case in which a spread illuminating apparatus 50 includes a double-sided tape 55 for fixing the spread illuminating apparatus 50 to a liquid crystal display panel 51, the white double-sided tape according to the present invention can be used as the double-sided tape 55. However, the double-sided tape 55 is normally disposed on a peripheral edge portion of the spread illuminating apparatus 50, and also functions to block light that has leaked from the peripheral edge portion, thereby establishing an effective emitting region 29 of the spread illuminating apparatus 50. In such a case, the specific structure is as follows.

The double-sided tape 55 includes a substrate 52 and adhesive layers 53 and 54 formed on both surfaces of the substrate 52. The substrate 52 is configured such that a light blocking unit such as black printing or the like is provided on one surface (in this case, the surface on the side opposing the liquid crystal display panel 51) of a white substrate similar to the substrate 16 of the double-sided tape 15 for fixing the FPC 12 to the light guide plate 20. The adhesive layer 53 formed on the surface of the substrate 52 on the side opposing the light guide plate 20 is made of a white adhesive layer similar to the white adhesive layer 17 of the substrate 16. The adhesive layer 54 formed on the surface of the substrate 52 on the side opposing the liquid crystal display panel 51 (on which the black printing has been provided) can have any appropriate structure, but is typically made with a conventional transparent adhesive layer.

In this way, by configuring the side of the double-sided tape 55 that opposes the light guide plate 20 with the white adhesive layer 53 and the white substrate 52 such that it has a light reflecting property, the brightness of the effective emitting region 29 can be improved.

Depending on the means for fixing the liquid crystal display panel 51 and the spread illuminating apparatus 50 to each other, a one-sided adhesive tape consisting of the substrate 52 and the white adhesive layer 53 without the adhesive layer 54 can also be disposed on the peripheral edge of the spread illuminating apparatus 50.

What is claimed is:
1. A spread illuminating apparatus comprising:
a plurality of light sources,
a circuit board on which the plurality of light sources are mounted, and
a light guide plate including an end surface at which the plurality of light sources are disposed in an opposing manner and a principal surface to which the circuit board is fixed using a double-sided tape, wherein the double-sided tape comprises a white substrate that reflects light and a white adhesive layer that reflects light and is formed on a surface of the white substrate on a side opposing the light guide plate, and the white adhesive layer is prepared by mixing a light reflecting substance into an adhesive.

2. The spread illuminating apparatus according to claim 1, wherein in the double-sided tape, the thickness of the white adhesive layer is greater than that of the white substrate.

3. The spread illuminating apparatus according to claim 1, further comprising a frame that accommodates the plurality of light sources and the light guide plate, wherein an end surface or a vicinity thereof of the light guide plate that opposes the end surface on the side at which the light sources are disposed is fixed to the frame using the double-sided tape.

4. The spread illuminating apparatus according to claim 1, wherein the light reflecting substance is a white pigment.

5. The spread illuminating apparatus according to claim 2, further comprising a frame that accommodates the plurality of light sources and the light guide plate, wherein an end surface or a vicinity thereof of the light guide plate that opposes the end surface on the side at which the light sources are disposed is fixed to the frame using the double-sided tape.

6. The spread illuminating apparatus according to claim 2, wherein the light reflecting substance is a white pigment.

7. The spread illuminating apparatus according to claim 3, wherein the light reflecting substance is a white pigment.

* * * * *